United States Patent
Kimura

(10) Patent No.: US 8,395,671 B2
(45) Date of Patent: Mar. 12, 2013

(54) IMAGING DEVICE AND IMAGING METHOD FOR CORRECTING EFFECTS OF MOTION ON A CAPTURED IMAGE

(75) Inventor: Masayuki Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 446 days.

(21) Appl. No.: 12/671,755

(22) PCT Filed: Jun. 2, 2009

(86) PCT No.: PCT/JP2009/002457
§ 371 (c)(1),
(2), (4) Date: Feb. 2, 2010

(87) PCT Pub. No.: WO2009/150793
PCT Pub. Date: Dec. 17, 2009

(65) Prior Publication Data
US 2011/0157379 A1    Jun. 30, 2011

(30) Foreign Application Priority Data

Jun. 9, 2008   (JP) .................................. 2008-150168

(51) Int. Cl.
*H04N 5/225*    (2006.01)
(52) U.S. Cl. .................................. 348/208.14
(58) Field of Classification Search ............. 348/208.99, 348/208.1, 208.2, 208.3, 208.12, 208.14, 348/169; 382/103
See application file for complete search history.

(56) References Cited

U.S. PATENT DOCUMENTS

| | | | | |
|---|---|---|---|---|
| 2002/0036692 | A1* | 3/2002 | Okada | 348/208.99 |
| 2003/0053661 | A1* | 3/2003 | Magarey | 382/103 |
| 2003/0169933 | A1* | 9/2003 | Song et al. | 382/239 |
| 2008/0095402 | A1  | 4/2008 | Kochi et al. | |
| 2009/0059031 | A1* | 3/2009 | Miyakoshi | 348/222.1 |
| 2009/0175496 | A1* | 7/2009 | Kondo et al. | 382/103 |

FOREIGN PATENT DOCUMENTS

| | | |
|---|---|---|
| JP | 2000-92499 | 3/2000 |
| JP | 2002-112252 | 4/2002 |
| JP | 2003-304486 | 10/2003 |
| JP | 2007-281961 | 10/2007 |
| JP | 2008-89314 | 4/2008 |

OTHER PUBLICATIONS

International Search Report issued Jul. 7, 2009 in International (PCT) Application No. PCT/JP2009/002457.

* cited by examiner

*Primary Examiner* — Jason Whipkey
(74) *Attorney, Agent, or Firm* — Wenderoth, Lind & Ponack, L.L.P.

(57) ABSTRACT

A wearable camera that is an imaging device includes a sensing unit that senses motion of a camera, and a prediction unit that calculates a pixel shift distance (d) between frames based on the results of the sensing. The prediction unit obtains a position (p1') by moving a feature point (p1) extracted from the previous frame image by the pixel shift distance (d), and the setting unit sets a window (w4) having a position (p1') as the center in the current frame image ($F_{t+1}$). A search unit searches the window (w4) and detects a feature point (q1) corresponding to the feature point (p1).

14 Claims, 15 Drawing Sheets

| Sensor output a' | Frame rate Fr (a') | ISO Film speed (a') | Shutter speed S (a') |
|---|---|---|---|
| — | 30 | 80 | 1/60 |
| 0.010 | 40 | 100 | 1/100 |
| 0.015 | 50 | 150 | 1/150 |
| 0.020 | 60 | 200 | 1/200 |
| 0.025 | 60 | 200 | 1/200 |
| ... | ... | ... | ... |

40a  40b  40c  40d

IMAGING DEVICE AND IMAGING METHOD FOR CORRECTING EFFECTS OF MOTION ON A CAPTURED IMAGE

BACKGROUND OF INVENTION

1. Technical Field

The present invention relates to an imaging device, and in particular to technology for correcting an influence of physical motion of the imaging device on a captured image.

2. Background Art

Among imaging devices, a wearable camera is a camera that is anticipated to be continually worn by a wearer, and to be continually imaging. By continually recording images, wearable cameras are expected to be effectively utilized for aiding recall of human memory, etc. (for example, see Patent Literature 1).

Since this type of wearable camera is anticipated to be continually used, in cases such as when the wearer is moving vigorously or when the camera is not firmly fixed to the wearer, the camera shakes irregularly. The video captured when the camera is swaying in this way also shakes irregularly.

Since shaky videos are likely to cause dizziness and a feeling of discomfort called "video induced motion sickness" in users, correcting and removing the shakiness from the video is necessary.

One method for removing shakiness uses a motion vector. Since the calculation load is large when searching from one end of an image to the other for motion vector detection, there is conventional technology for setting a window, as a search range, in one portion of the image.

The smaller the window, the more the calculation load can be reduced, but when the physical motion of the camera is great, there is a possibility that the resulting motion vector of the image cannot be detected. Nonetheless, setting a large window leads to an increase in the calculation load necessary for the search. In this way, there is a trade-off relationship between the size of the window and the calculation load.

Related to this, there is technology (Patent Literature 2) that, by changing an image capturing frame rate to a higher value when the motion vector between frame images is large, can handle even large motions while decreasing the relative amount of motion between frames and suppressing the size of the window to a constant (Patent Literature 2).

CITATION LIST

Patent Literature

[Patent Literature 1]
Japanese Patent Application Publication No. 2003-304486
[Patent Literature 2]
Japanese Patent Application Publication No. 2007-281961

SUMMARY OF INVENTION

However, actually the motion between frame images includes both motion originating in physical motion of the recording camera itself, and also motion originating in the image-captured object. Distinguishing between these different types of motion based only on the captured image is difficult, and when the camera and the object are moving in different directions, it is difficult to accurately estimate the physical motion of the camera using the technique disclosed in Patent Literature 2.

Also, in the technique recited in the above-referenced Patent Literature 2, since the processing flow is performed so that first the motion vector is detected, and then the frame rate is changed, there is a risk that, when an extremely large physical motion occurs, this motion vector cannot be detected, and the frame rate also cannot be changed.

Although when the size of the window is made larger, the possibility of detection becomes greater, increasing the size of the window leads to an increase in the calculation load, as described above. This issue regarding the technique of detecting the motion vector is not limited to wearable cameras, and may occur in imaging devices in general.

The present invention has been achieved in view of the above problems, and an aim thereof is to provide an imaging device that can detect a motion vector, caused by large physical motions of the camera itself, between frame images.

The imaging device of the present invention includes an imaging unit operable to capture an image of an object; a sensing unit operable to sense physical motion of the imaging unit; an extraction unit operable to extract a feature point from a first frame image; a prediction unit operable to predict, according to the sensed physical motion, a position in which the feature point extracted from the first frame image is to appear in a second frame image that follows the first frame image after a fixed number of frames; a setting unit operable to set a window in the second frame image according to the position predicted by the prediction unit; and a search unit operable to search in the set window of the second frame image for a feature point corresponding to the feature point extracted from the first frame image.

The imaging method of the present invention includes the steps of: capturing an image of an object with use of an imaging unit; sensing physical motion of the imaging unit; extracting a feature point from a first frame image; predicting, according to the sensed physical motion, a position in which the feature point extracted from the first frame image is to appear in a second frame image that follows the first frame image after a fixed number of frames; setting a window in the second frame image according to the position predicted by the prediction unit; and searching in the set window of the second frame image for a feature point corresponding to the feature point extracted from the first frame image.

According to the structure described in the Solution to the Problem section, the prediction unit uses the sensed motion to obtain, for example, a change of the field angle of the camera, using this to predict the position of the feature point. The setting unit provides a window that is highly likely to include the feature point in the second frame image by setting the window in the second frame image according to the predicted position, thus enabling efficiently searching for the feature point by starting the search from the area in the window.

Also, even when the sensed motion is great due to the camera itself moving greatly, predicting the position of the feature point and setting the window according to the motion enables fitting the feature point in the window of the second frame image. As a result, the feature point can be detected in the second frame image, and can be used for detecting the motion vector between images.

Also, the setting unit may set the window so as to include the position predicted by the prediction unit.

According to this structure, the window can be set in an area that is likely to contain the feature point.

Also, the setting unit may set the window so that the position predicted by the prediction unit is in a center of the window.

According to this structure, the window can be set in an area that is likely to contain the feature point.

Also, the setting unit may set the window so that a center thereof is a midpoint between a position, in the second frame image, corresponding to the position of the feature point extracted from the first frame image, and the position predicted by the prediction unit.

Since the feature point is likely to exist between the position extracted in the first frame image and the position predicted by the prediction unit, according to this structure, the window can be set reliably.

Also, the frame rate change unit may be operable to change the frame rate of the imaging unit to a higher value when the amount of the physical motion sensed by the sensing unit is greater than or equal to a predetermined threshold.

According to this structure, changing the frame rate to a higher value when the sensed motion is greater than or equal to a predetermined threshold enables achieving the effects of reducing the amount of motion of the feature point between frame images, and facilitating the detection of the feature point even when the window size is small.

Also, the frame rate change unit may be further operable to change the frame rate to a first value when the amount of the motion sensed by the sensing unit is greater than or equal to the predetermined threshold, and to change the frame rate to a second value that is higher than the first value when the amount of the motion sensed by the sensing unit is greater than or equal to a second threshold that is higher than the predetermined threshold.

According to this structure, changing the frame rate to a first value or a second value according to the sensed motion enables reducing the amount of motion of the feature point between frame images, thus contributing to a more efficient search for the feature point.

Also, the imaging device may be configured so that the larger the physical motion sensed by the sensing unit, the higher the frame rate change unit changes the frame rate.

According to this structure, changing the frame rate to a higher value according to the sensed motion enables reducing the amount of motion of the feature point between frames, thus contributing to a more efficient search for the feature point.

Also, the frame rate change unit may perform an operation to change the frame rate at a predetermined time interval that is longer than a time interval between frame images.

Also, the imaging device may further include a shutter speed change unit operable to change a shutter speed of the imaging unit to a higher value when the amount of the physical motion sensed by the sensing unit is greater than or equal to a predetermined threshold.

According to this structure, changing the shutter speed to a higher value when the sensed motion is greater than or equal to the predetermined threshold enables suppressing blurriness in the image and reducing the possibility of erroneous feature point detection when searching.

Also, the imaging device may further include a film speed change unit operable to change a film speed of the imaging unit to a higher value when the physical motion sensed by the sensing unit is greater than or equal to a predetermined threshold.

According to this structure, increasing the film speed when capturing images enables compensating for the reduction of light amount due to the increase of shutter speed, and suppressing fluctuation of brightness of the image.

Also, the setting unit may be further operable to change a size of the set window in proportion to the amount of the physical motion sensed by the sensing unit.

According to this structure, setting a large window when the physical motion is great, for example, enables increasing the probability of the feature point fitting in the window.

Also, the setting unit may change the size of the window when the amount of the physical motion sensed by the sensing unit is larger than a preset value.

According to this structure, the probability of the feature point fitting in the window is increased in a case such as, for example, when the physical motion is great and it is difficult to handle the situation merely by changing the frame rate.

Also, the setting unit may set an entirety of the second frame image as a search range once per a predetermined number of frames.

When the feature point cannot be detected due to shaking of the image or blocking by an obstruction, etc., there are cases in which the feature point is excluded from subsequent windows. Setting the entirety of the second frame image as the search range once per a predetermined number of frames enables reliably fitting the feature point in the search range.

Also, the sensing unit may be composed of at least one of an angular speed sensor and an acceleration sensor.

BRIEF DESCRIPTION OF DRAWINGS

FIG. 15 is a change table including the items of sensor output, frame rate, frame speed, and shutter speed.

DESCRIPTION OF INVENTION

Embodiment 1

The following describes an embodiment of the present invention using a wearable camera that is an imaging device as an example.

[Structure]

Figure 1:
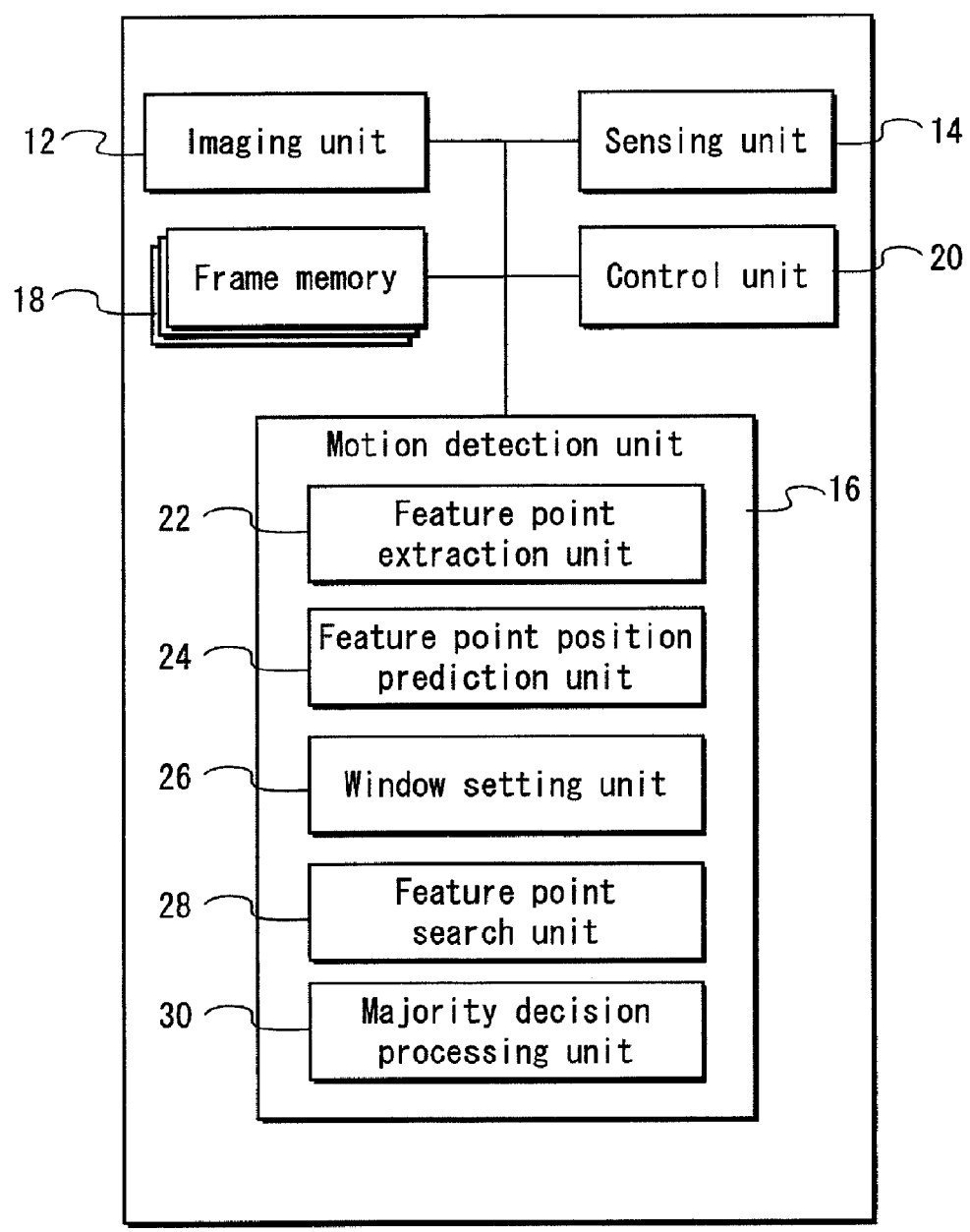
FIG. 1 is a functional block diagram of a wearable camera pertaining to embodiment 1.

FIG. 1 is a functional block diagram of a wearable camera pertaining to embodiment 1.

The wearable camera 10 includes an imaging unit 12, a sensing unit 14, a motion detection unit 16, a frame memory 18, and a control unit 20.

The imaging unit 12 is constituted from an image capturing element such as a CCD (Charge Coupled Device) or a CMOS (Complementary Metal-Oxide Semiconductor) and a lens unit, and fulfils a function of capturing an image of an object and outputting the resulting image.

The sensing unit 14 fulfills the function of sensing a physical motion of the imaging unit 12. Specifically, the sensing unit 14 is constituted from a vibrating-type angle speed sensor incorporated in a housing of the wearable camera, and in particular, the sensing unit 14 senses an angular speed as physical motion.

The motion detection unit 16 includes a feature point extraction unit 22, a feature point position prediction unit 24, a window setting unit 26, a feature point search unit 28, and a majority decision processing unit 30, and detects a motion vector between frames of images captured by the imaging unit 12. The detected motion vector is provided for use in correcting shakiness between frame images.

The feature point extraction unit 22 extracts feature points from frame images $F_t$ (the frame image $F_t$ and the frame image $F_{t+1}$ are temporally continuous frames, and the order is referred to respectively as "previous frame image $F_t$", "current frame image $F_{t+1}$"). A known technique that is generally used (for example, extracting feature points that are edges and corners in the image with use of a Harris corner detector) is used as a technique of extracting the feature points.

The feature point position prediction unit 24 acquires sensor information including angular speed from the sensing unit 14, and a prediction is made as to which position in the current frame image the feature points in the previous frame image is to appear in, based on the acquired sensor information.

The window setting unit 26 sets a window of the feature point search unit 28 in the frame image $F_{t+1}$. The window defines a search range for the feature point, and is smaller than the size of the frame image.

The feature point search unit 28 searches in a window that has been set in the current frame image $F_{t+1}$ for a feature point corresponding to the feature point in the previous frame image $F_t$.

The majority decision processing unit 30 creates a plurality of pairs of feature points by combining one each of a plurality of feature points extracted by the feature point extraction unit 22, and a plurality of feature points detected by the feature point search unit 28, and decides the motion of the entire frame image according to a majority decision principle. The details are described below.

A general technique called the matching method can be used in this search. That is to say, by comparing the brightness level of a pixel in the window of the current frame image $F_{t+1}$ to the brightness level of the feature point of the previous frame image $F_t$, the pixels in the window are searched for the corresponding feature point.

The frame memory is a memory for storing images in frame units, and the frame memory stores images, etc. output by the imaging unit 12.

The control unit 20 is constituted from a ROM or a RAM that stores a control program, and controls the functional blocks.

Next, the following describes the specific content of the sensing unit 14.

[Sensing Unit 14]

Figure 2A:
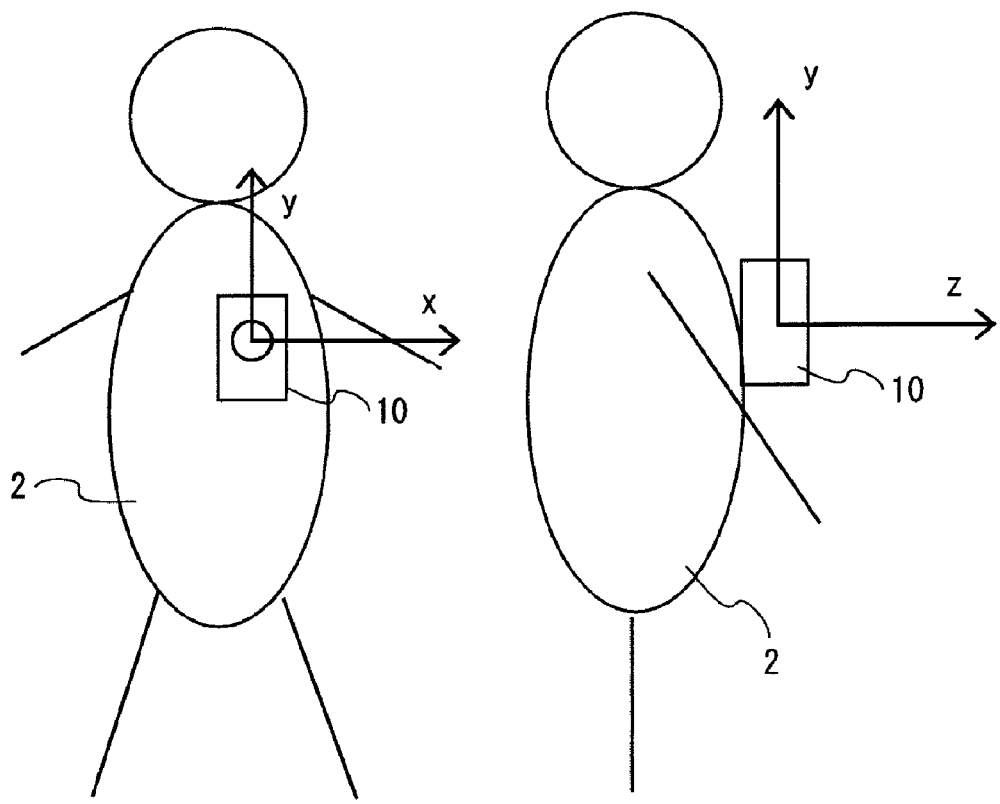
FIG. 2A is a schematic view of a user 2 wearing the wearable camera.

FIG. 2A is a schematic view of a user 2 wearing the wearable camera.

The wearable camera 10 is fastened to the user 2 in a position in the vicinity of the left chest portion. The fastening is performed with use of a cord, to be hung from the neck of the user, that extends from the upper portion of the housing of the wearable camera 10, and a clip on the back face of the housing.

As shown in FIG. 2A, an x axis is set in the horizontal direction, a y axis is set in the vertical direction, and a z axis is set in an orthogonal direction to the xy plane (matching the optical axis direction of the wearable camera 10).

Figure 2B:
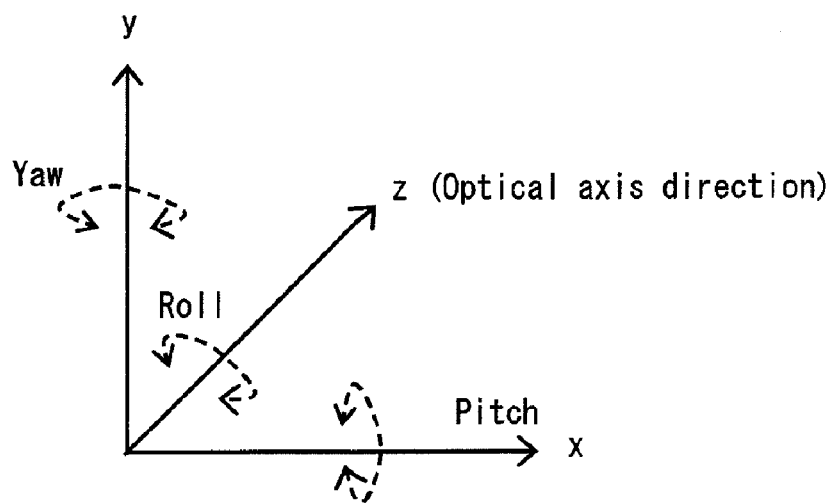
FIG. 2B is a schematic view of a rotation axis of an image.

Also, as shown in FIG. 2B, rotation around the x axis is referred to as "pitch", rotation around the y axis is referred to as "yaw", and rotation around the z axis is referred to as "roll".

A vibrating-type angular speed sensor that constitutes the sensing unit 14 uses Coriolis force to detect angular speed.

When an object having a mass m on a coordinate system rotating at an angular speed ω is moving at a speed v, Fc of Coriolis force in the vertical direction is applied to the moving direction of the object, and this amount is expressed by the following Expression 1.

[Expression 1]

$$F_c = 2mV\omega \qquad \text{(Expression 1)}$$

The angular speed ω can be obtained by detecting the Coriolis force Fc. The angular speed can actually be obtained by a method such as measuring an amount changed of the voltage and current of the Coriolis force with use of a piezoelectric element. Also, by arranging piezoelectric elements in a plurality of directions, it is possible to detect the angular speed of rotation in each rotating direction.

Note that the number of sensors incorporated in the sensing unit 14 may be one in each direction, or may be a plurality in each direction. For example, taking the average of output values of n sensors enables obtaining more accurate sensor information, since the S/N ratio increases in proportion to the square root of n.

Next, the following specifically describes feature point extraction, search, majority decision processing, and window setting of the motion detection unit 16.

[Feature Point Extraction/Searching]

Figure 3:
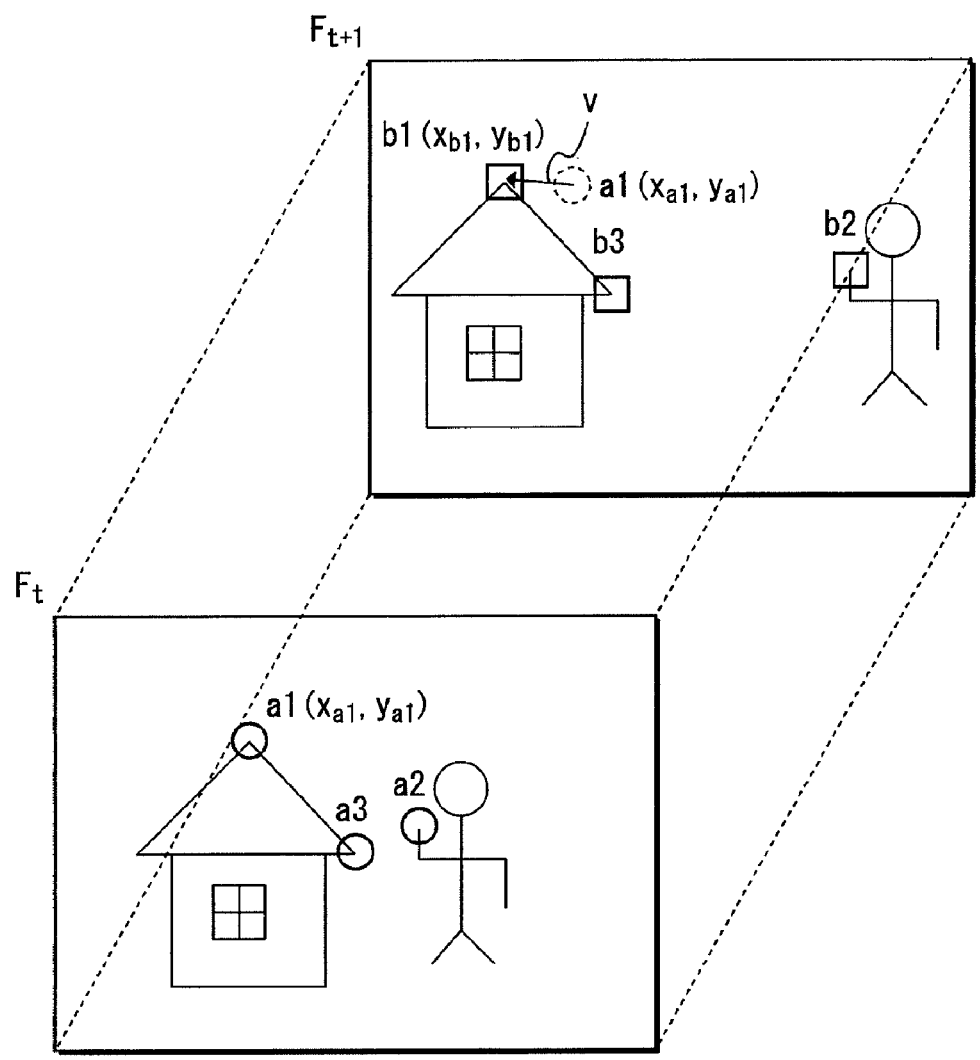
FIG. 3 shows a previous frame image $F_t$ in a lower portion, and a current frame image $F_{t+1}$ in an upper portion.

FIG. 3 shows a previous frame image $F_t$ in a lower portion, and a current frame image $F_{t+1}$ in an upper portion.

The points a1, a2, and a3 in FIG. 3 are feature points extracted from the frame image $F_t$ by the feature point extraction unit 22. The coordinates of the feature points a1, a2, and a3 are respectively $(x_{a1}, y_{a1})$ $(x_{a2}, y_{a2})$, and $(x_{a3}, y_{a3})$, in that order.

The points b1, b2, and b3 are feature points detected by the feature point search unit 28 searching the frame images $F_t$. The feature points b1, b2, and b3 are feature points corresponding respectively to the feature points a1, a2, and a3, and the coordinates of the feature points b1, b2, and b3 are respectively $(x_{b1}, y_{b1})$, $(x_{b2}, y_{b2})$, and $(x_{b3}, y_{b3})$, in that order.

[Majority Decision Processing]

The majority decision processing unit 30 sets a feature point assembly of the previous frame image $F_t$ as Pa={(xa1, ya1), . . . , (xai, yai)}, and a feature point assembly of the current frame image $F_{t+1}$ as Pb={(xb1, yb1), . . . , (xbj, ybj)}, and creates pairs of feature points by selecting one feature point each from among Pa and Pb. Then a vector v is calculated from the pairs of feature points, the feature points of Pa are shifted according to the vector v, and a number e of these that match any of the feature points Pb is counted.

Specifically, in the example of the feature points a1 to a3 and b1 to b3 described above, when a pair is created by selecting a1 and b1, the vector v between the two points is expressed by Expression 2.

[Expression 2]

$$v = \begin{pmatrix} x_{b1} - x_{a1} \\ y_{b1} - y_{a1} \end{pmatrix} \quad \text{(Expression 2)}$$

Next, the majority decision processing unit 30 shifts all of the feature points (a1, a2, a3) of the previous frame images $F_t$ along this vector v. Then the majority decision processing unit 30 counts the number of feature points of the current frame image $F_{t+1}$ that exist in the positions of the shifted feature points. Since the positions of the feature points do not necessarily completely match due to the influence of the image shaking, etc., for example, a feature point needs only to exist in a range of a distance δ from the position of the shifted feature point. In the above example, a judgment can be made that among the three feature points, two pairs (a1, b1) and (a3, b3) conform to the vector v.

When a vector v' is calculated in a similar manner based on a2 and b2, a judgment can be made that only one pair, (a2, b2), conforms to the vector v'.

Subsequently, this judgment is performed also for the remaining combinations of feature points, and a determination is made that the vector to which the most feature point pairs conform is the motion vector for all of the frame images. In the example of FIG. 3, a judgment can be made that the vector v obtained based on the pairs of (a1, b1) and (a3, b3) is the motion vector for all of the frame images.

Note that instead of calculating a provisional motion vector for all of the feature point pairs, the processing may be repeated for a predetermined time only, for example 10 milliseconds, and the motion vector that matches the most in that time may be output. Particularly in a case in which processing time is limited, this method enables achieving an optimal result in the limited time.

[Window Setting]

The feature point search unit 28 performs a search based on the brightness level, etc. extracted by the feature extraction unit 22 as described above. However, when the entire image of the current frame image $F_{t+1}$ is set as the search range, the calculation load becomes excessive, and efficiency is reduced since the search range includes areas not likely to contain the feature point.

For this reason, in the present embodiment, setting a window as a search range in the current frame image $F_{t+1}$ enables restricting the search range and reducing the calculation load.

Figure 4:
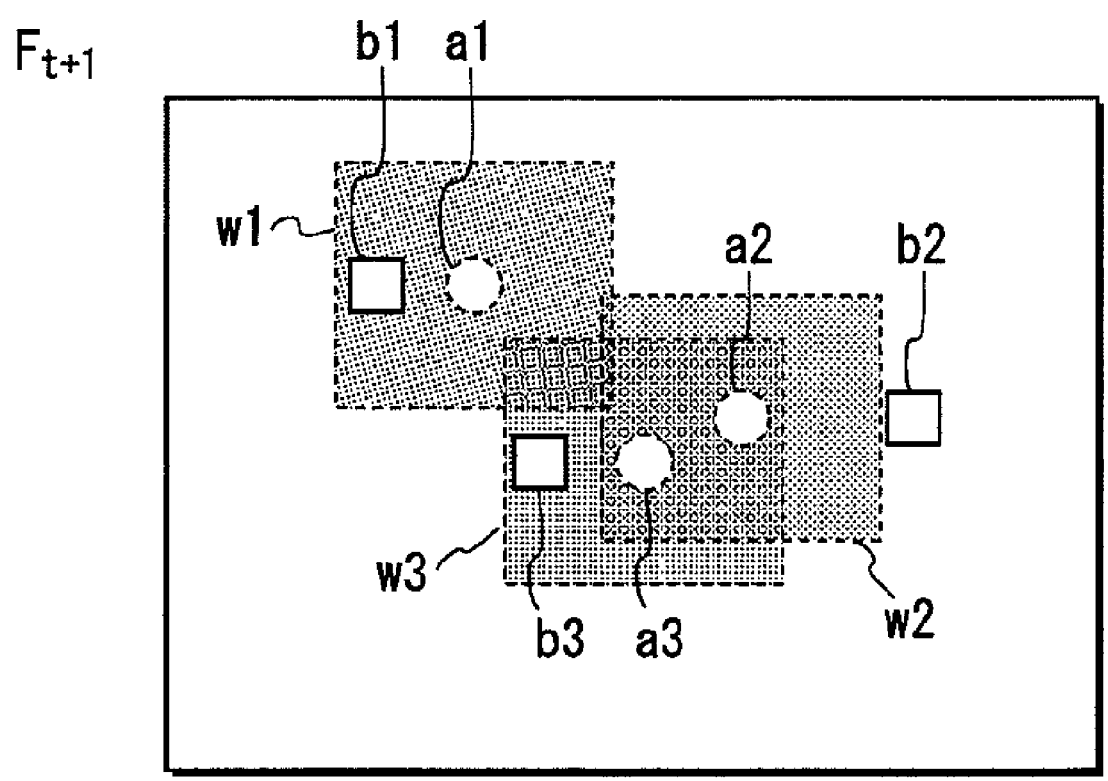
FIG. 4 shows an example of windows set by a window setting unit 26.

FIG. 4 shows an example of windows set by the window setting unit 26.

As shown in FIG. 4, a window w1 that is the search range for searching for the feature point corresponding to the feature point a1, a window w2 that is the search range for searching for the feature point corresponding to the feature point a2, and a window w3 that is the search range for searching for the feature point corresponding to the feature point a3, are set in the current frame image $F_{t+1}$.

Here, in the case of the window w2, since a feature point b2 that corresponds to the feature point a2 is positioned outside the window w2, the feature point b2 is not detected by the feature point search unit 28. In this way, controlling the detection of unnecessary feature points by the window setting enables not only reducing the calculation load but also improving the precision of detecting the motion vector. This structure also enables suppressing the erroneous detection of feature points.

Each of the windows w1 to w3 is set so that the feature points a1, a2, and a3 of the previous frame image $F_t$ are located in a center of the respective window. In the present embodiment, to set the windows more precisely, the windows are set with use of a sensed motion.

[Feature Point Position Prediction]

Next, the following describes a technique of predicting, based on the sensed motion, where the feature point of the previous frame image $F_t$ is located in the current frame image $F_{t+1}$.

First, the feature point position prediction unit 24 acquires, from the sensing unit 14, a motion at the time of the current frame image $F_{t+1}$, and calculates a pixel shift distance d in the image, based on the acquired motion.

Figure 5A:
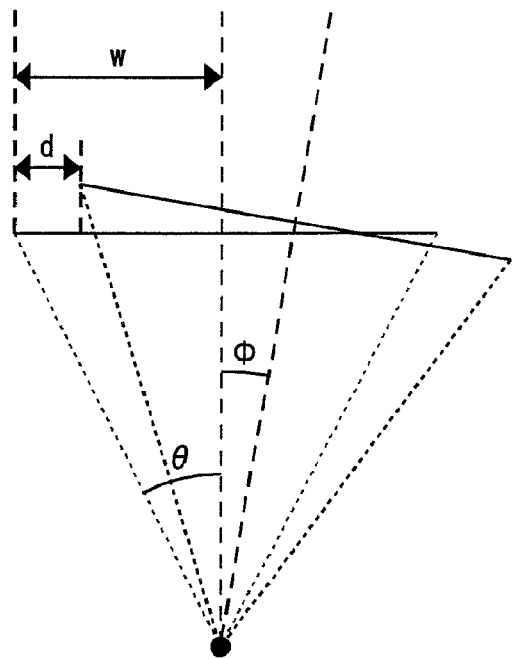
FIGS. 5A and 5B are schematic diagrams showing relationships between a rotation angle (field angle) of a camera and a pixel shift distance.
Figure 5B:
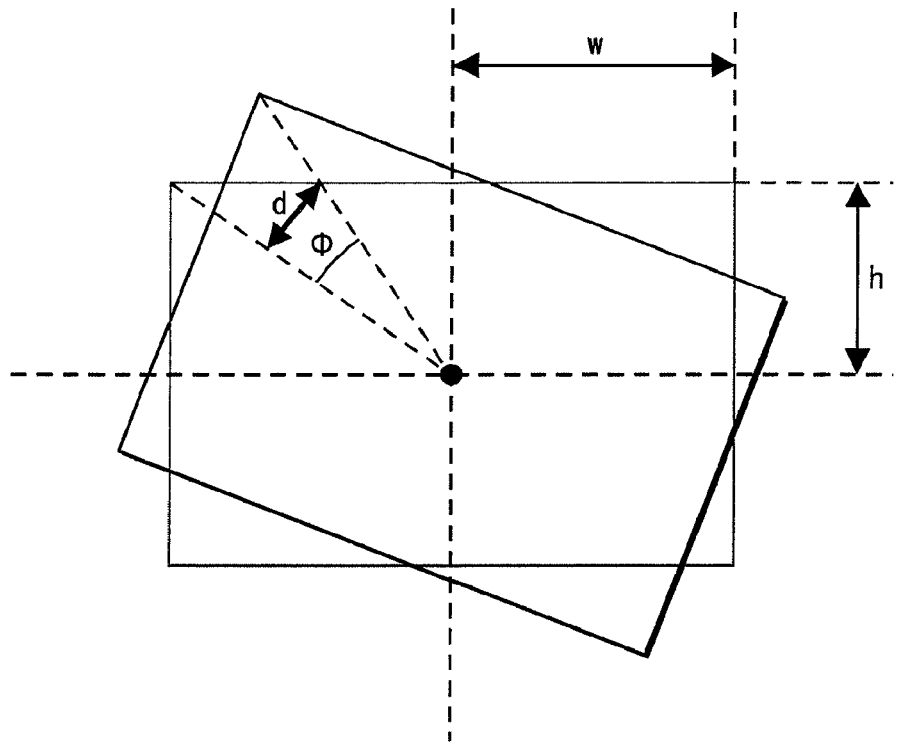

FIGS. 5A and 5B are schematic diagrams showing a relationship between a rotation angle (field angle) of the camera and the pixel shift distance d. The following describes the method of calculating the pixel shift distance d with reference to FIGS. 5A and 5B.

For example, consider that the camera rotates in the yaw direction, and the angular speed of rotation in the yaw direction is measured by a sensor. At this time, when the camera has rotated only ø as in FIG. 5A, the relationship indicated in Expression 3 is established between ø and the pixel shift distance d that indicates the distance of motion of each pixel in the image.

[Expression 3]

$$d = w\left(1 - \frac{\sin(\theta - \phi)}{\sin\theta}\right) \quad \text{(Expression 3)}$$

Note that w is half the value of a resolution in the horizontal direction, and θ is half the value of the horizontal field angle. Also, d is set as a value that is approximately equal for every position in the image. Here, postulating that the angles θ and ø are minuscule, Expression 3 can approximate Expression 4, below.

[Expression 4]

$$d \approx w\frac{\phi}{\theta} = b\phi \quad \text{(Expression 4)}$$

Also, when the angular speed of rotation is denoted as a and the frame rate of the video is denoted as $F_r$, Expression 4 can be rewritten as Expression 5, below.

[Expression 5]

$$d = \frac{ba}{F_r} \quad \text{(Expression 5)}$$

A constant b is determined automatically provided that the field angle and resolution of the camera has been set, and since the frame rate $F_r$ is determined at the time of capturing the images, the angular speed of rotation obtained by the sensor according to Expression 5 can be correlated with the shift distance d.

Note that such relationships are established similarly in the case of the pitch direction of the camera. In this way, horizontal and vertical shift distances in the image can be obtained.

Also, the relationship of Expression 6 is established in the case of rotation in the roll direction of the camera, as shown in FIG. 5B.

[Expression 6]

$$d = 2\frac{h\sin\frac{\phi}{2}}{\cos\left(\tan^{-1}\left(\frac{w}{h}\right) - \phi\right)} \quad \text{(Expression 6)}$$

Note that Expression 6 expresses that the value of the shift distance d is greatest at the edges of the image, and is smaller the closer the value is to the center. When Expression 6 is expressed using an angular speed of rotation a and a frame rate $F_r$, the following Expression 7 is obtained.

[Expression 7]

$$d = 2\frac{h\sin\frac{a}{2F_r}}{\cos\left(\tan^{-1}\left(\frac{w}{h}\right) - \frac{a}{F_r}\right)}. \quad \text{(Expression 7)}$$

A predicted position is obtained using the above method.

[Window Setting Used for the Predicted Position]

Setting the windows based on predicted positions calculated by the feature point position prediction unit 24 in this way enables reducing the calculation load, avoiding detecting unnecessary feature points, and improving precision. The following specifically describes the window setting with reference to FIGS. 6 and 7.

Figure 6:
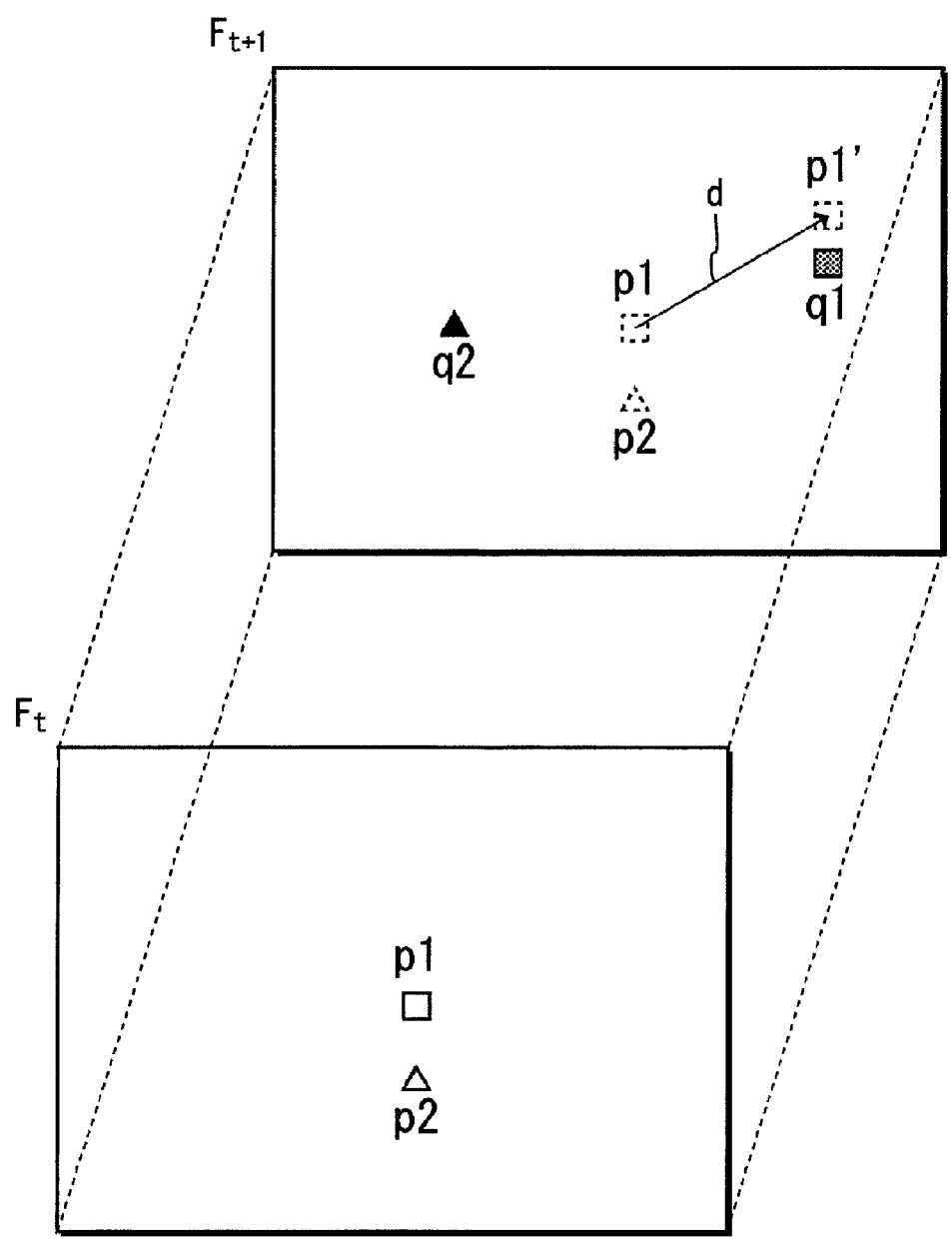
FIG. 6 shows a previous frame image $F_t$ in a lower portion, and a current frame image $F_{t+1}$ in an upper portion.

FIG. 6 shows a previous frame image $F_t$ of a time t in a lower portion, and a current frame image $F_{t+1}$ of a time t+1 in an upper portion.

In FIG. 6, the points p1 and p2 are feature points extracted from the previous frame image $F_t$ by the feature point extraction unit 22. The points q1 and q2 are feature points corresponding respectively to the points p1 and p2.

The arrow indicated by the reference symbol d in the current frame image $F_{t+1}$ is a vector indicating the shift distance d calculated by the reference point position prediction unit 24, and is set as the point p1' (the predicted position point p1') obtained by moving the feature point p1 the shift distance d. Between capturing the previous frame image $F_t$ and the current frame image $F_{t+1}$, if only the imaging unit is moving and the image-captured object is not moving, a prediction can be made that the feature point p1 is in the vicinity of the point p1'.

Figure 7A:
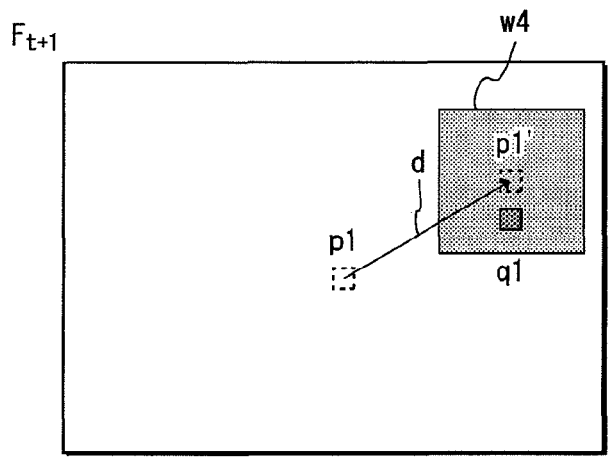
FIGS. 7A and 7B show window setting using predicted positions.
Figure 7B:
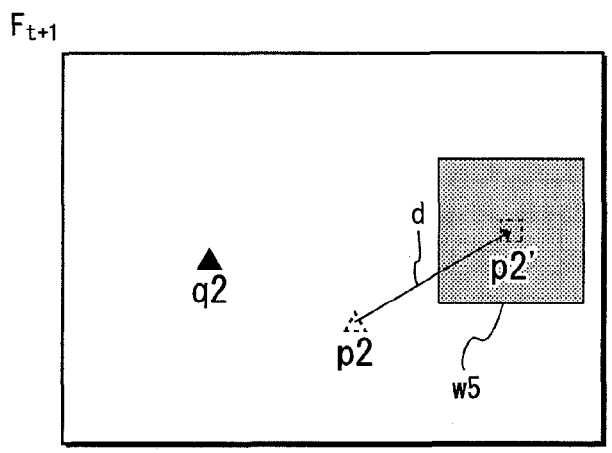

FIGS. 7A and 7B show window setting using predicted positions.

As shown in FIG. 7A, the window w4 is set to have the predicted position point p1' as a center. Similarly, as shown in FIG. 7B, the window w5 is set to have the predicted position point p2' as a center (the predicted point reached by moving the point p2 the shift distance d).

By setting the window w4 to have the predicted position point p1' as the center in this way, provided that the image-captured object at the point p1 of the previous frame image Ft has not shifted between capturing the previous frame image $F_t$ and the current frame image $F_{t+1}$, the point q1 corresponding to the point p1 can fit in the window w4, thus enabling realizing a precise setting with use of a narrow window.

On the other hand, if the image-captured object has moved greatly between capturing the previous frame image $F_t$ and the current frame image $F_{t+1}$, as shown in FIG. 7B, the point q2 corresponding to the point p2 can be excluded from the window w5, and a case of detecting motion caused by motion of the image-captured object can be prevented.

Figure 7C:
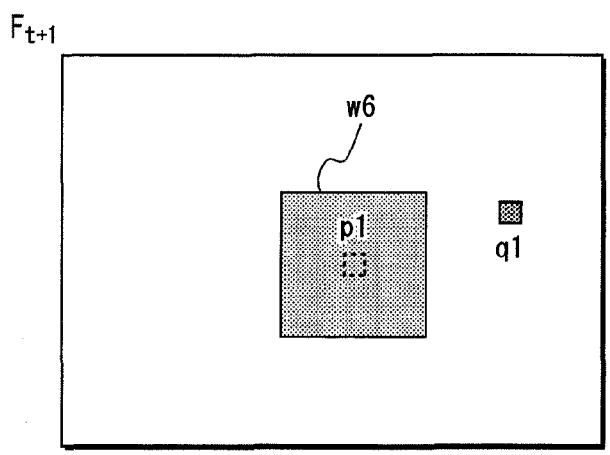
FIG. 7C shows window setting not using a predicted position.

FIG. 7C, similarly to FIGS. 7A and 7B, shows window setting that does not use predicted positions, and has the feature point p1 of the previous frame image $F_t$ as the center position. In the case of FIG. 7C, since the feature point q1 is outside the window w6, at this size the feature point q1 cannot be detected. Although the feature point q1 would be detectable if the size of the window 6 were made larger, this is likely to lead to an increase in calculating load and a reduction in detecting precision.

[Operation]

Figure 8:
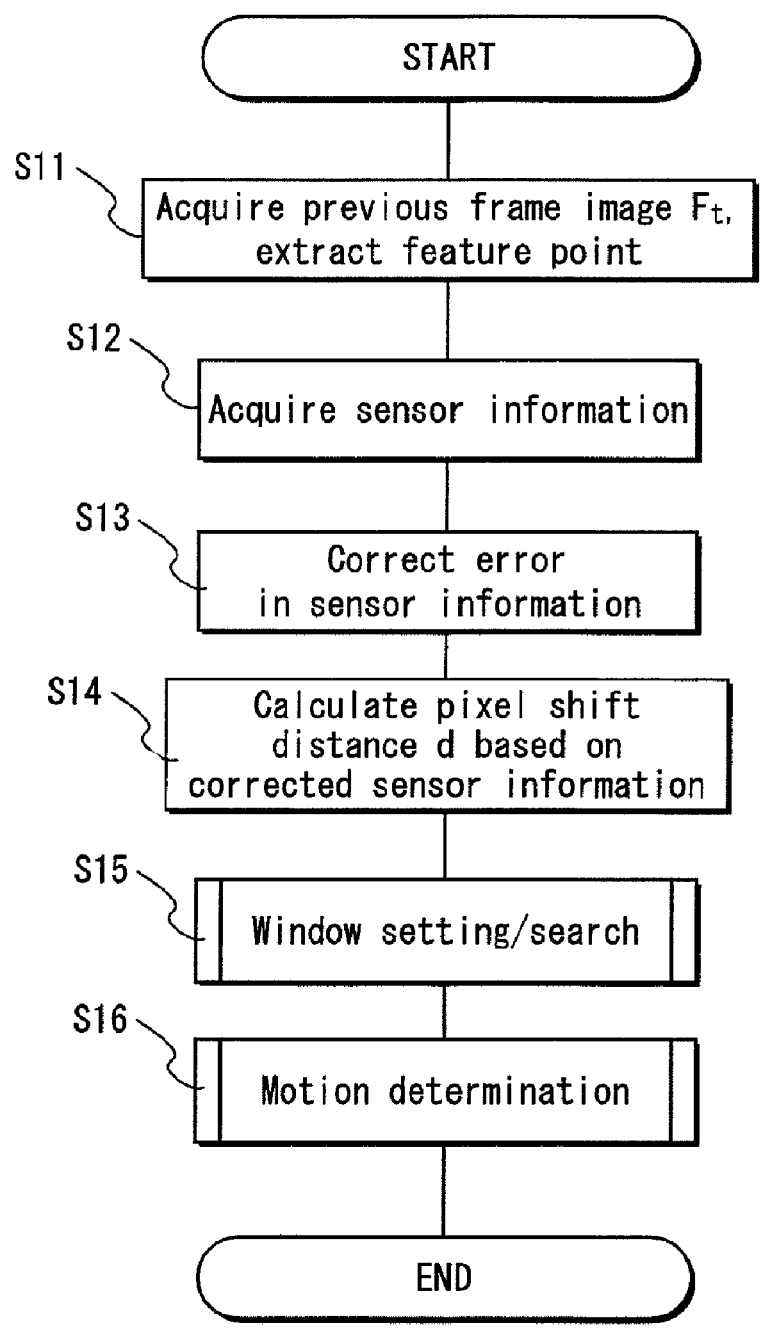
FIG. 8 is a flowchart showing overall processing content of the wearable camera.
Figure 9:
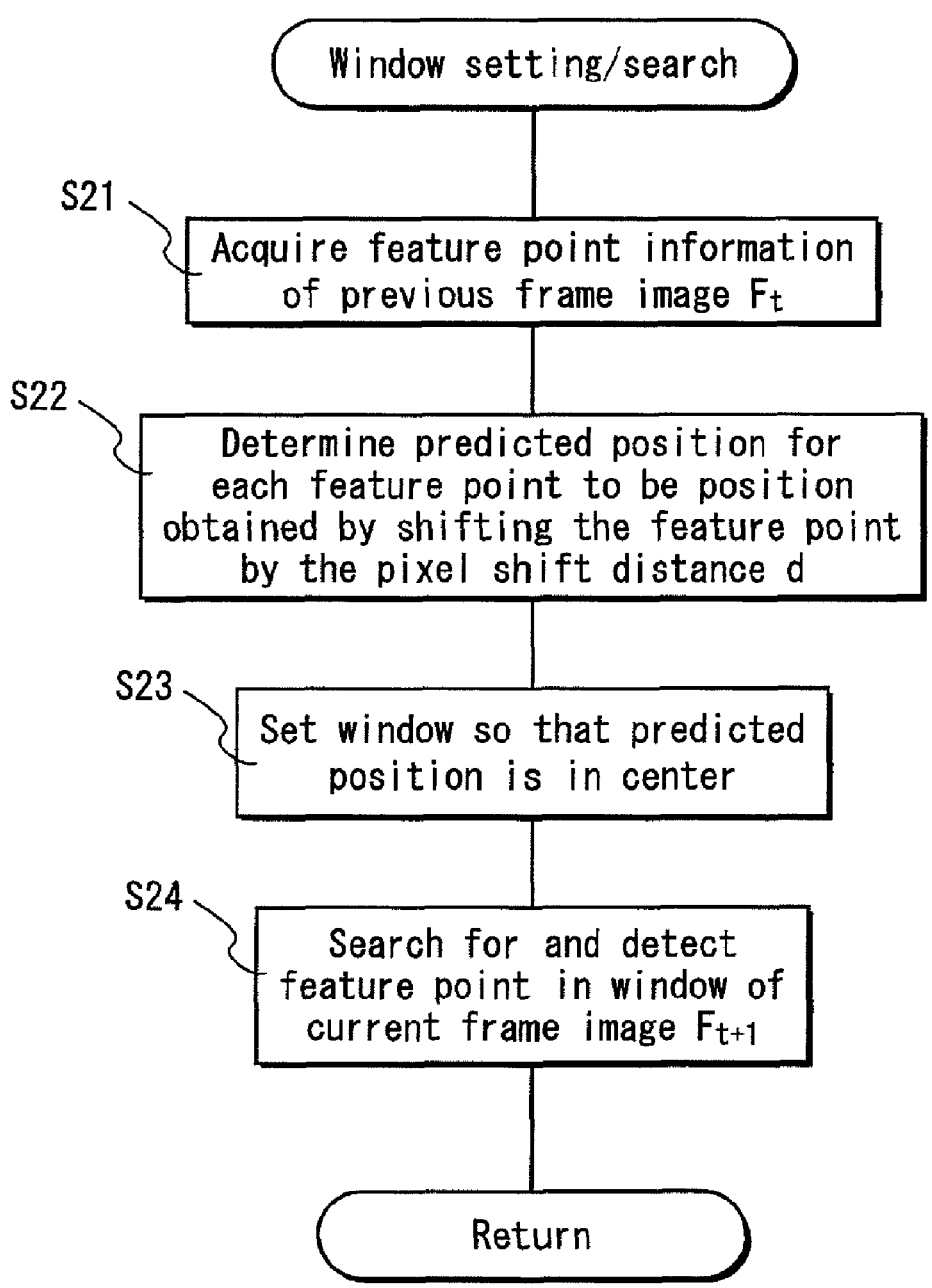
FIG. 9 is a flowchart showing window setting and search processing.
Figure 10:
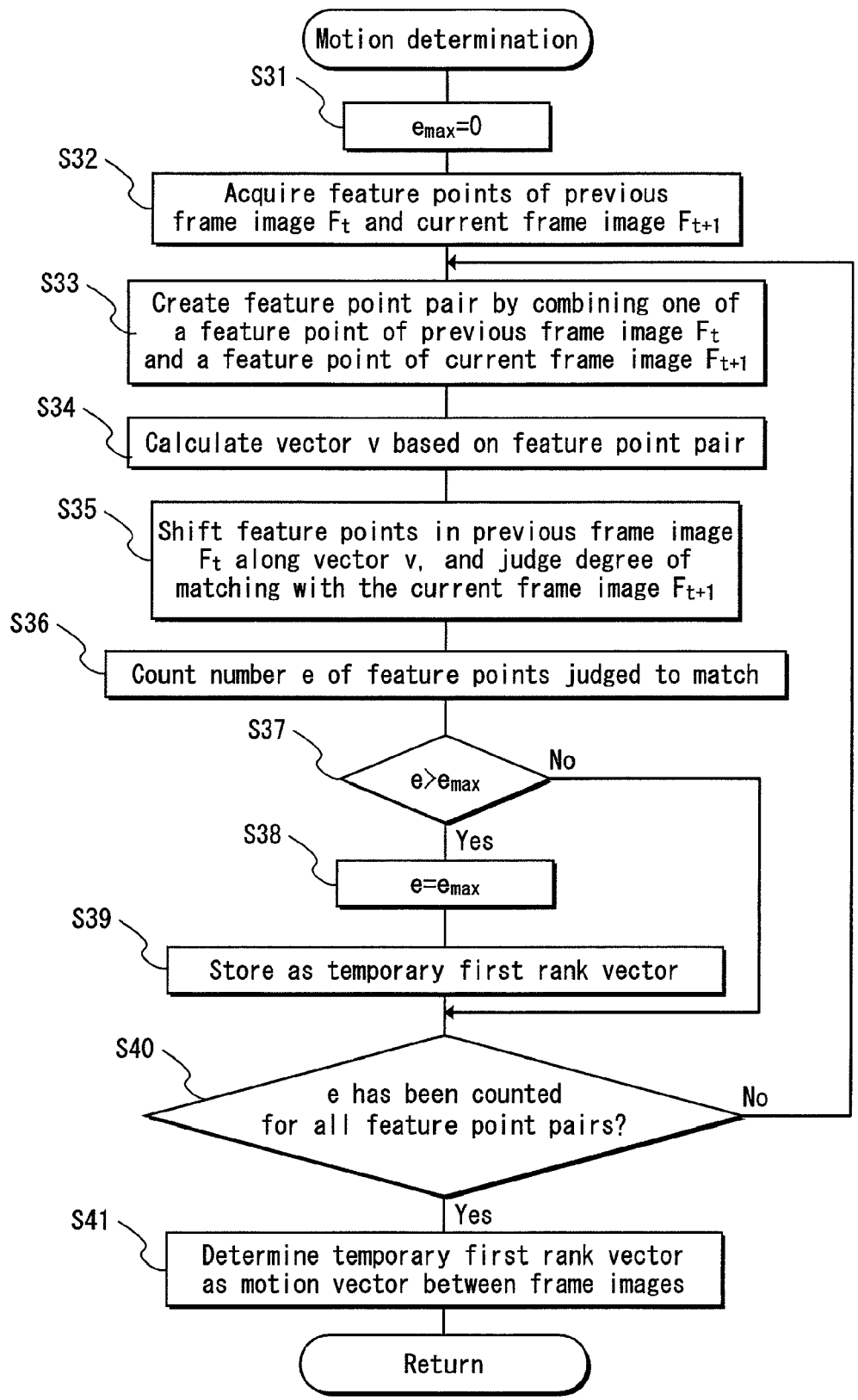
FIG. 10 is a flowchart showing motion determination processing.

The following describes the operation of the wearable camera 10 of the present embodiment with reference to FIGS. 8 to 10. Since the basic operational flow is as described previously, explanation of such similar portions is simplified.

As shown in FIG. 8, first, the feature point extraction unit 22 acquires the previous frame image $F_t$ from the frame memory, and extracts a feature point from the acquired previous frame image $F_t$ (S11). Then the feature point position prediction unit 24 acquires, from the sensing unit 14, an angular speed in the current frame image $F_{t+1}$ (S12), and corrects an error in the acquired angular speed (S13).

Note that the angular speed in step S12 is acquired for the purpose of judging the angular speed (angular speed that influences the motion of the frame images) in the period from the previous frame image $F_t$ to the current frame image $F_{t+1}$, the angular speed in step S12 is not necessarily acquired at the time (time t+1) of the current frame $F_{t+1}$. For example, the angular speed may be a value acquired at the time (time t) of the previous frame image $F_t$, or may be an average of a plurality of values acquired between the time t and the time t+1, inclusive.

For example, correction of the error is performed as follows.

Figure 11:
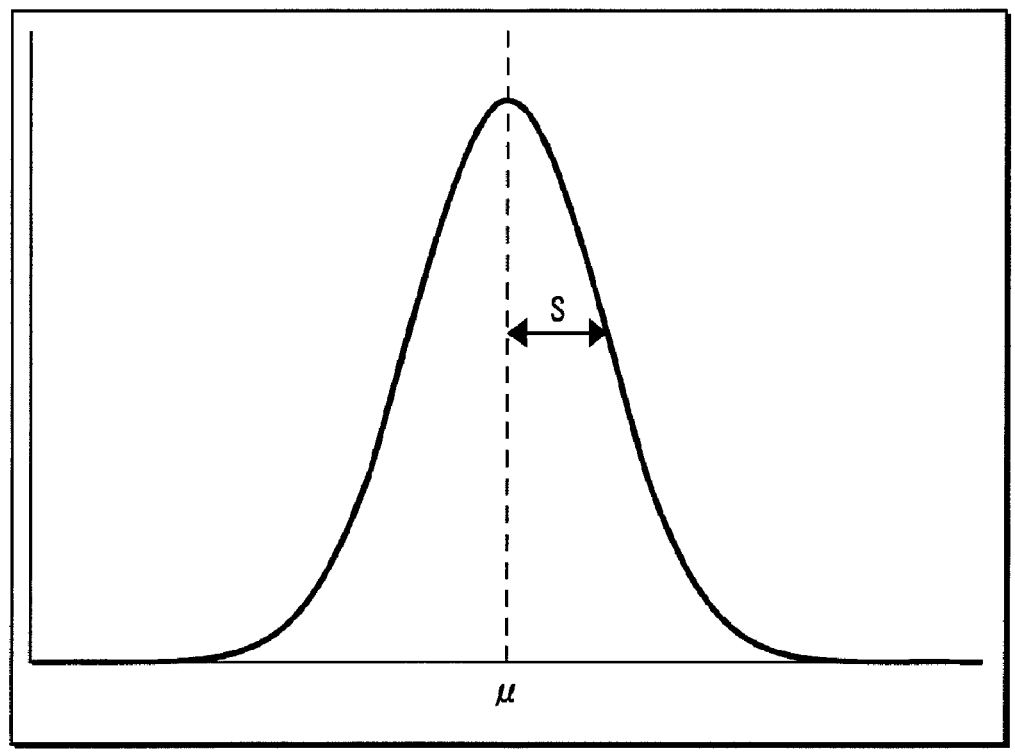
FIG. 11 is a schematic diagram of error distribution of sensor output.

First, the error distribution in the sensor of the sensing unit 14 is measured. For example, as shown in FIG. 11, the errors in the sensor output are consistent with a normal distribution for a standard deviation σ. At this time, it is possible to determine a correction amount based on the average μ of the normal distribution. For example, when the sensor output is a, the corrected value a' can be calculated according to the following Expression 8.

[Expression 8]

$$a' = a + \mu + x\sigma \quad \text{(Expression 8)}$$

In Expression 8, x is a constant, and based on the nature of the normal distribution in general, approximately 95% of the output when x=2 or approximately 99% of the output when x=3 is included in the error range. Accordingly, changing to a value of x according to an allowed size of error enables determining an optimal correction amount. Regarding actual correction of errors, the average μ of the error of the sensor, the standard deviation σ, and the variable x are recorded in a ROM, etc. of the control unit 20 in advance, at the time of correction these values are read, and correction is performed according to Expression 8.

Next, the feature point position prediction unit 24 calculates a pixel shift distance d in the images based on the corrected angular speed (S14). The calculation method of the pixel shift distance d is as described in the description of FIG. 5.

When the calculation is finished, processing proceeds to window setting processing (S15) and motion determination processing (S16).

As shown in FIG. 9, in the window setting processing, the window setting unit 26 acquires feature point information of the frame image $F_t$ (S21).

Then, the window setting unit 26 determines the predicted position for each feature point to be a position obtained by shifting the feature point by the pixel shift distance d (S22), and sets the window so that the predicted position is in the center thereof (S23).

The feature point search unit 28 searches for the feature point in the window set in the current frame image $F_{t+1}$ (S24).

As shown in FIG. 10, in the motion determination processing, the majority decision processing unit 30 determines the motion vector between frame images.

Specifically, the majority decision processing unit 30 sets $e_{max}=0$ (S31), and acquires feature points of the previous frame image $F_t$ and the current frame image $F_{t+1}$ (S32). Then, the majority decision processing unit 30 creates a feature point pair by combining one feature point of the previous frame image $F_t$ and one feature point of the current frame image $F_{t+1}$ (S33). A vector v is calculated based on the created feature point pair (S34), each feature point in the previous frame image Ft is shifted according to the vector v, and a degree of matching between the feature points in the previous frame image $F_t$ and the feature points in the current frame image $F_{t+1}$ is determined (S35).

The majority decision processing unit 30 counts a number e of feature points judged to match (S36). If the number e is greater than the heretofore maximum value $e_{max}$ (S37: Yes), the majority decision processing unit 30 sets the number e as a new maximum value $e_{max}$ (S38), and stores the vector v as a provisional first rank vector (S39).

The processing from step S33 to step S39 is repeated, and when the number e has been counted for all of the feature point pairs (S40: Yes), the first rank motion vector is set as the motion vector between frame image $F_t$ and frame image $F_{t+1}$ (S41). Note that the processing from FIG. 8 to FIG. 10 is performed for each output of a frame image by the imaging unit 12, in other words, for each frame.

As described above, according to the present embodiment, the pixel shift distance d, which is a value predicting how far the feature point in the previous frame image $F_t$ will have shifted in the current frame image $F_{t+1}$, is obtained based on the angular speed sensed by the sensing unit 14. Then a window is set so that the predicted position in which the feature point has been shifted by the pixel shift distance d is in the center. This enables realizing an accurate window setting, suppressing the calculation load, and by extension, suppressing the amount of consumed power. In addition, performing an accurate window setting enables actively excluding from the window any feature point that is not consistent with the motion of the wearable camera, in other words, excluding motion of the object itself that is not due to the motion of the camera, thus enabling improving the precision of motion detection.

Also, even if the pixel shift distance d is large due to the wearable camera moving greatly, since the feature point is shifted according to the pixel shift distance d, and the window is set so that the predicted position after shifting is in the center, the window size can be suppressed to a constant, and large motions can be detected.

Note that although in the description of FIG. 7 above, a square window is set so that the predicted position p1' is in the center thereof, the predicted position p1' is not necessarily the center. Provided that the window is set to at least include the predicted position p1', an accurate setting can be realized. Also, the same effect can be achieved when, for example, the window is set as described below. The following describes such cases as variations.

Figure 12A:
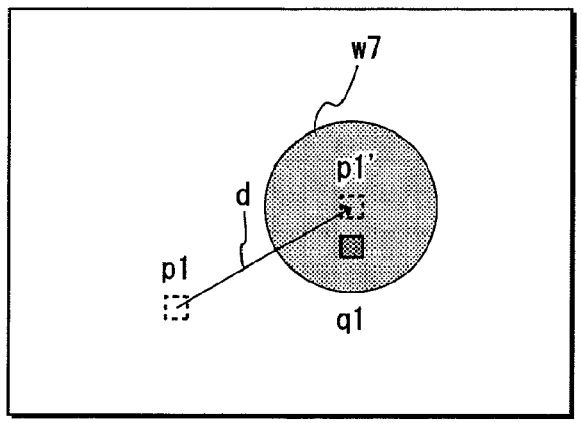
FIG. 12A illustrates window setting pertaining to variation 1.
Figure 12B:
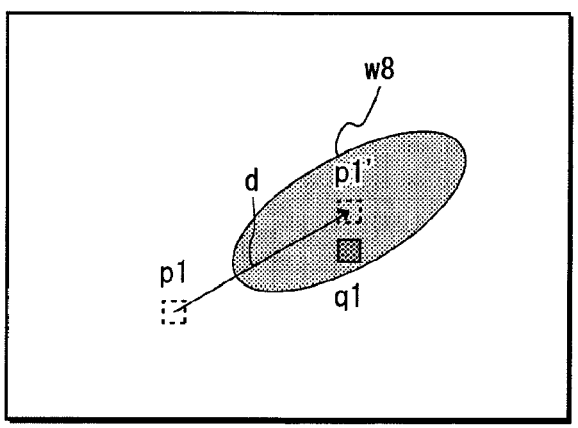
FIG. 12B illustrates window setting pertaining to variation 2.

FIGS. 12A and 12B illustrate window setting pertaining to variations 1 to 3.

[Variation 1]

In FIG. 12A pertaining to variation 1, a window w7 is not square, but is a circle in which the predicted position p1' is in a central position. Since the feature point q1 which is to be detected is likely to have been shifted into a range such as a range in which the predicted position p1' is the center, setting the circular window w7 enables performing an efficient feature point search.

[Variation 2]

In FIG. 12B pertaining to variation 2, the window w8 is not a square, but is an oval in which the predicted position p1' is in the center position. Since the feature point q1 which is to be detected is likely to have been shifted in a direction along the direction of the pixel shift distance d, setting the window w8 so that a length axis thereof aligns with the direction of the pixel shift distance d enables performing an efficient feature point search.

[Variation 3]

Figure 12C:
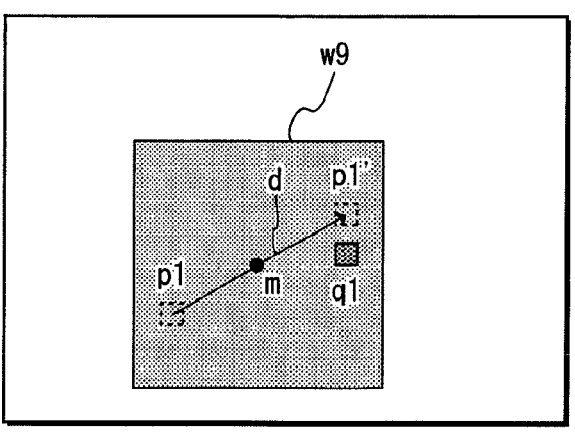
FIG. 12C illustrates window setting pertaining to variation 3.

In FIG. 12C pertaining to variation 3, the center position of the window w9 is not the predicted position p1', but is instead a midpoint m between the predicted position p1' and the feature point p1. This window w9 also enables contributing to an efficient feature point search.

Embodiment 2

In Embodiment 2, in addition to the structure in embodiment 1, by changing the frame rate, etc. according to the motion of the wearable camera, the window size can be suppressed to a constant size, and large motions can be detected.

Figure 13:
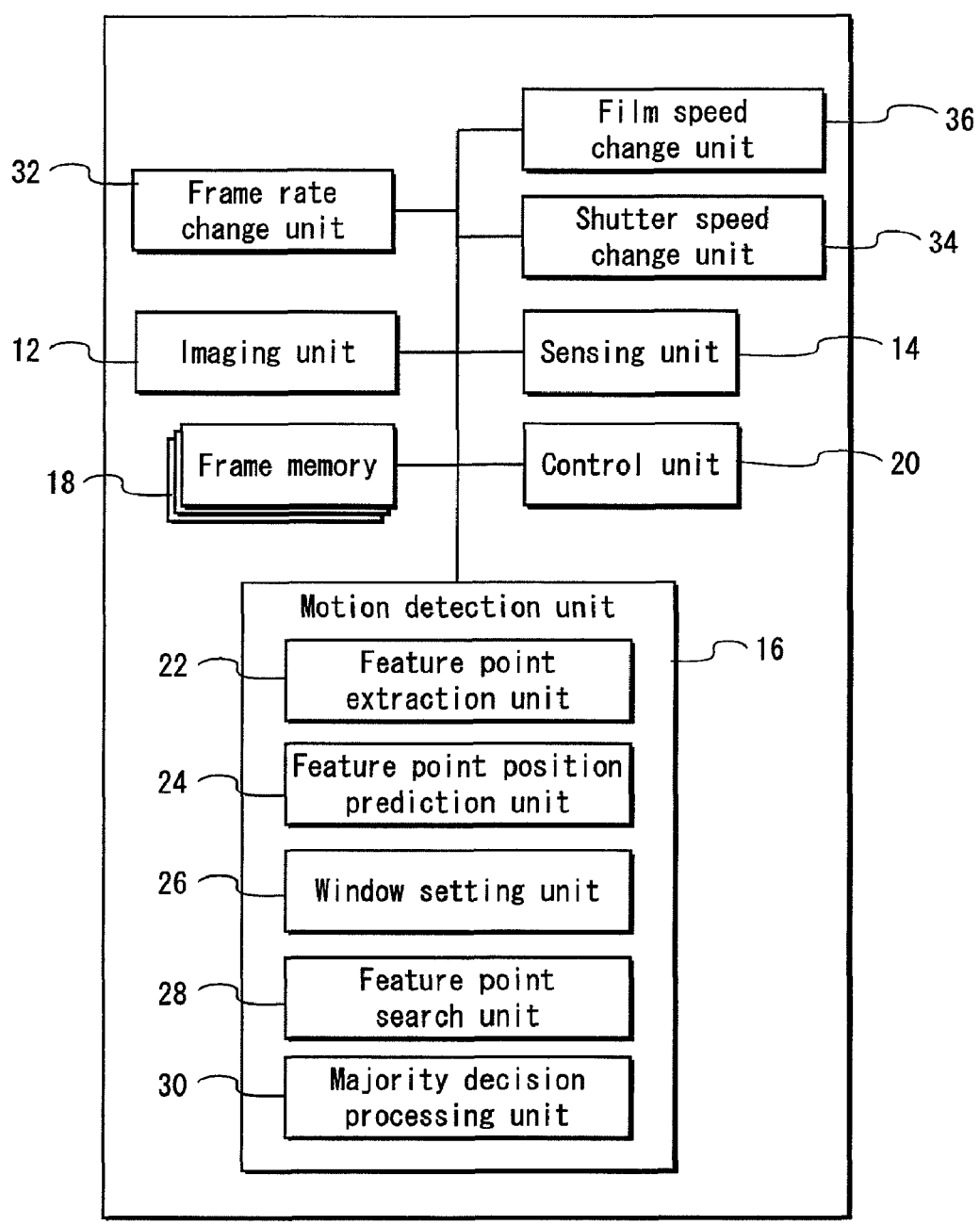
FIG. 13 is a functional block diagram of the wearable camera pertaining to embodiment 2.

FIG. 13 is a functional block diagram of the wearable camera pertaining to embodiment 2.

A wearable camera 11 includes a frame rate change unit 32, a shutter speed change unit 34, and a film speed change unit 36. Since other functional blocks are the same as FIG. 1, the same reference notations are used and description thereof is omitted.

The frame rate change unit 32 acquires a sensor output from the sensing unit 14, and changes a frame rate $F_r$ of the imaging unit 12 according to the acquired sensor output.

The shutter speed change unit 34 acquires the sensor output from the sensing unit 14, and changes a shutter speed of the imaging unit 12 according to the acquired sensor output.

The film speed change unit 36 compensates for the reduction of light amount due to the increase of shutter speed by changing a film speed of the imaging unit 12 in tandem with the change of shutter speed by the shutter speed change unit 34.

Figure 14:
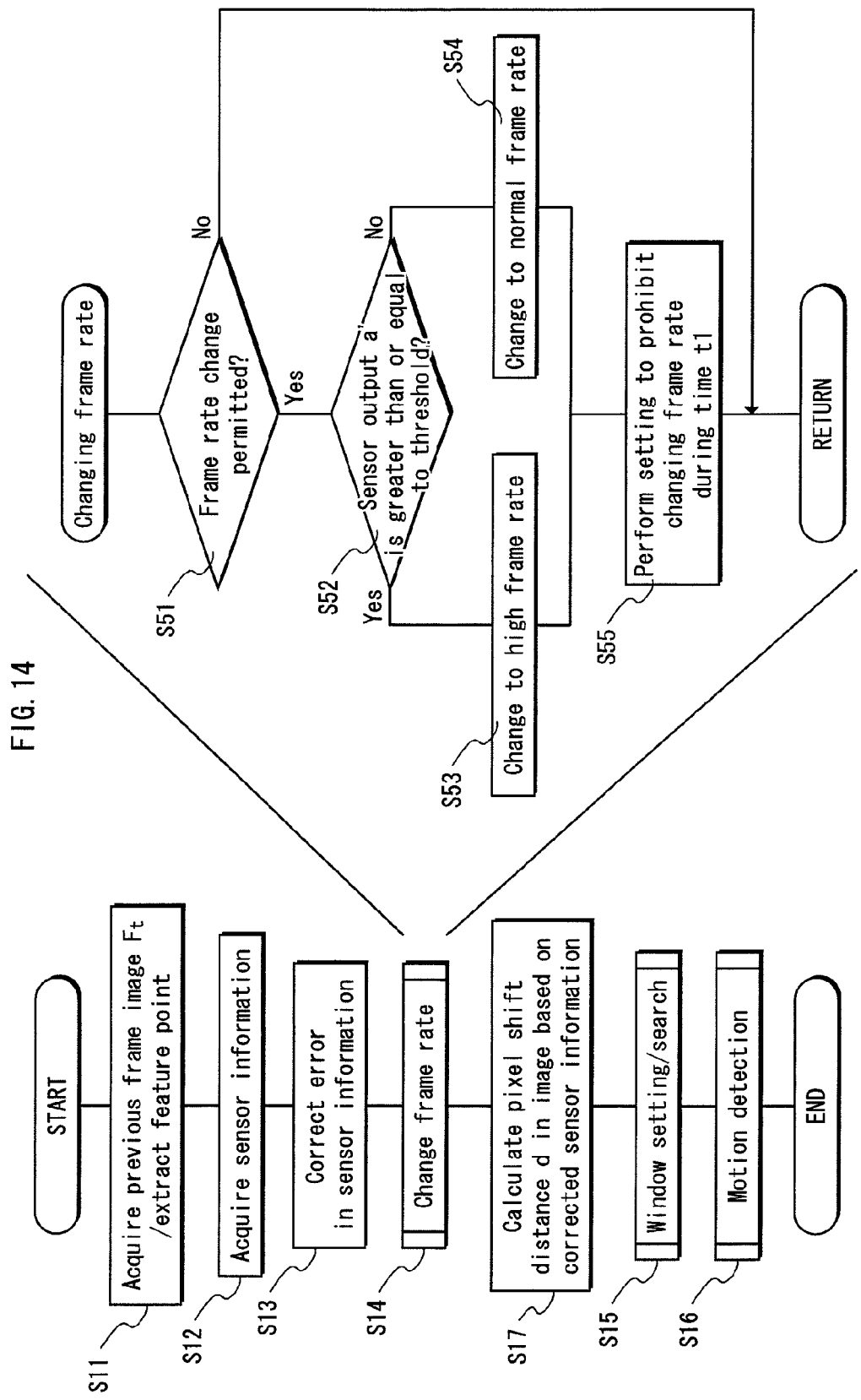
FIG. 14A is a flowchart showing overall processing content of the wearable camera pertaining to embodiment 2.
FIG. 14B is a flowchart showing processing for changing the frame rate.

FIGS. 14A and 14B are flowcharts showing overall processing content of the wearable camera pertaining to embodiment 2.

FIG. 14A is basically similar to the flowchart of FIG. 8, but frame rate change processing (S17) has been added. In FIG. 14A, steps that are similar to steps in FIG. 8 have been given the same step numbers, and description thereof is omitted.

As shown in FIG. 14B, in the frame rate change processing, the frame rate change unit 32 judges whether frame rate change is permitted (S51), acquires a sensor output a' included in sensor information corrected in step S13, and judges whether the sensor output a' is greater than or equal to the threshold (S52).

The method of setting the threshold is as follows.

As described above, the pixel shift distance d for a certain frame rate $F_r$ is determined according to Expression 5 and Expression 7. Also, due to the nature of window processing, when a certain feature point has been shifted, motion detection cannot be performed unless the shifted position is in the range of the window. In view of this, giving $d_{max}$ to a maximum shift distance for which motion detection can be performed, a limit rotation acceleration $a_{max}$ is acquired. For example, when Expression 5 is solved for a and $d=d_{max}$, the value of $a_{max}$ is defined in the following Expression 9.

[Expression 9]

$$a_{max} = \frac{F_r}{b} d_{max} \quad \text{(Expression 9)}$$

Similarly, when Expression 7 is solved for a, a value of the limit rotation acceleration value for rotation in the Roll direction can be obtained. This $a_{max}$ can be used as the threshold.

If the sensor output a' is greater than or equal to the threshold (S52: Yes), the frame rate change unit 32 changes the frame rate of the imaging unit 12 to a high frame rate Fr (a') (S53). Specifically, when d' (note that $d'<d_{max}$) is set as a target value, for example, $F_r$ (a') according to Expression 5 is given in the following Expression 10.

[Expression 10]

$$F_r(a') = \frac{a'}{d'} b \quad \text{(Expression 10)}$$

Note that if the sensor output a' is less than the threshold (S52: NO), the frame rate change unit 32 changes the frame rate of the imaging unit 12 back to the normal frame rate (S54).

Then, a setting is performed to prohibit changing the frame rate during time t1 (S55). This setting specifies a change interval for the frame rate, and t1 is, for example, approximately several seconds.

By increasing the frame rate Fr toward $F_r$ (a'), the time difference between the frame image Ft and the next-captured frame image $F_{t+1}$ becomes shorter. This enables reducing the shift distance of the feature point. Also, since changing toward Fr (a') enables reliably capturing the feature point of the frame image $F_{t+1}$ within the window, even if there is a feature for which the object moves in a different direction from the motion of the camera, such motion can be consistently detected.

Note that the frame rate Fr (a') is a so-called target value of the frame rate, and there are cases in which, according to the specifications of the camera, etc., it takes time to change the original value to the target value, and the actual value is different from the target value.

Also, changing the frame rate may be performed as follows. The following describes a variation pertaining to embodiment 2.

[Variation 1]

FIG. 15 is a change table 40 including the items of sensor output, frame rate, film speed, and shutter speed. The change table 40 is recorded in the ROM of the control unit 20, and includes the following as items: a "sensor output a'" 40a, a "frame rate $F_r$ (a')" 40b, an "ISO film speed (a')" 40c, and a "shutter speed S (a')" 40d.

The larger the value of the "sensor output a'" 40a, the higher the "frame rate $F_r$ (a')" 40b, the higher the "ISO film speed (a')" 40c, and the faster the "shutter speed S (a')" 40d.

Note that since the frame rate of the wearable camera 11 is limited to a maximum of 60 fps, when the "sensor output a'" is 0.025, the frame rate is 60 fps, the same as when the "sensor output a'" is 0.020.

In variation 1, the control unit 20 acquires a corrected sensor output, and with reference to the change table, changes the frame rate, the film speed, and the shutter speed.

Gradually changing the variables according to the present variation 1 enables searching for feature points while suppressing consumed power.

Also, since there is a limit on frame rate as described above, in circumstances where physical motion is particularly great, that is, when the sensor output a' is particularly large, the possibility increases that the feature point will not fit in the window.

For this reason, a procedure may be used so that the window size corresponds to an elevated frame rate when physical motion is small, and when the frame rate reaches the maximum value (the physical motion exceeds a certain value), the window size is expanded.

[Variation 2]

Although in the description of embodiment 2, the frame rate changes depending on the sensor output, in variation 2, the frame rate also depends on the window size.

Specifically, although in Expression 10, when determining the frame rate, the shift distance d' is defined as a value lower than a shift distance $d_{max}$ that is the maximum value at which motion detection can be performed, now the frame rate is determined as a value lower than half the length of one window. This enables ensuring that the shifted feature point does not stick out of the window. Note that when the window is not a square having a predicted position p'1 as the center thereof, as in the above-described variation of embodiment 1, d' is determined according to the respective shape of the window. For example, when the window is oval as in variation 2 of embodiment 1, determining d' as half the length of the minor axis of the oval enables ensuring that the shifted feature point does not stick out of the window. Note that d' may be determined based on both the maximum shift distance $d_{max}$ and the sensor output.

[Supplementary Remarks]

Although this completes the description of the embodiments of the present invention, the present invention is not limited to the content described above, and various modifications can be implemented that achieve the aim of the present invention or a related or concomitant aim. For example, the following modifications are possible.

(1) Although setting a fixed window size is described in embodiments 1 and 2, the imaging device may also be configured to set a window having a larger size once every predetermined number of frames. In particular, the imaging device may be configured so that once every predetermined number of frames, the entire image is set as the search range.

As described above, a small window size is preferable. Setting the window to be narrow only in the vicinity of the feature point may interfere with detecting the feature point due to shaking of the image or blocking by an obstruction. In such a case, the feature point may be excluded from subsequent windows.

For this reason, setting the search range to be the entire image once every predetermined number of frames enables reliably fitting the feature point in the search range, and thus enables more consistent motion detection.

(2) Although an angular speed sensor is described as an example of the sensing unit 14 in embodiments 1 and 2, the sensing unit 14 is not limited to being an angular speed sensor, and may instead be an acceleration sensor.

(3) Although a wearable camera is described as an example of the imaging device in embodiments 1 and 2, the imaging device is not limited to this. The embodiments can be applied to any type of imaging device capable of recording video, starting with digital cameras. In particular, the embodiments are effective for imaging devices expected to be used in extreme conditions with a large degree of shaking and motion.

(4) In the description of embodiments 1 and 2, a feature point is extracted from the previous frame image $F_t$, and a search is performed for a feature point corresponding to a feature point extracted from a subsequent frame image $F_{t+1}$. Essentially, since it is not necessary to obtain the motion of the entire frame image between the frame image $F_t$ and the frame image $F_{t+1}$, it is also possible to, contrariwise, extract a feature point from the subsequent frame image $F_{t+1}$, and search from the previous frame image F.

Also, the frames need not necessarily be temporally adjacent frame images such as the frame images $F_t$ and $F_{t+1}$. For example, a feature point may be extracted from either one of a first frame image $F_1$ or a second frame image $F_2$ (a frame image temporally subsequent to the first frame image $F_1$), and even if a corresponding feature point is detected elsewhere, the motion vector of the entire image between the first frame image $F_1$ and the second frame image $F_2$ can be obtained.

Note that in this case, the sensing unit 14 detecting an angular speed in the time between, for example, the first frame image $F_1$ and the second frame image $F_2$, enables obtaining the pixel shift distance d, and predicting the position of the shifted feature point between frame images $F_1$ and $F_2$.

(5) Although not specifically mentioned in embodiment 2, an AE (Automatic Exposure) function generally used in an AE camera may be used as the shutter speed change unit 34 and the film speed change unit 36.

(6) A control program composed of program code for causing the operations and the processing (see FIGS. 8 to 10) described in the above embodiments to be executed by a processor of an imaging device such as a wearable camera, and various circuits connected to the processor, can be recorded on a recording medium, or circulated or distributed via communication lines of various types.

This type of recording medium may include an IC card, a hard disk, an optical disk, a flexible disk, a ROM, etc.

The circulated or distributed control program may be provided for use by storage in a memory, etc. read by the processor, and the various functions described in the embodiments may be realized by executing the control program.

INDUSTRIAL APPLICABILITY

The imaging device pertaining to the present invention is useful for detecting a motion vector between frame images while suppressing additional calculation load.

| [Reference Signs List] | |
|---|---|
| 10, 11 | wearable camera |
| 12 | imaging unit |
| 14 | sensing unit |
| 16 | motion detection unit |
| 20 | control unit |
| 22 | feature point extraction unit |
| 24 | feature point position prediction unit |
| 26 | window setting unit |
| 28 | feature point search unit |
| 30 | majority decision processing unit |
| 32 | frame rate change unit |
| 34 | shutter speed change unit |
| 36 | film speed change unit |
| $F_t$ | previous frame image |
| $F_{t+1}$ | current frame image |
| a1, a2, a3, p1, p2 | feature point of previous frame image $F_t$ |
| b1, b2, b3, q1, q2 | feature point of current frame image $F_{t+1}$ |
| d | pixel shift distance |
| p1', p2' | predicted positions (respectively, feature points p1 and p2 that have been shifted according to the pixel shift distance d) |
| w1 to w9 | window |

The invention claimed is:

1. An imaging device, comprising:
an imaging unit operable to capture an image of an object;
a sensing unit operable to sense physical motion of the imaging unit;
an extraction unit operable to extract a feature point from a first frame image;
a prediction unit operable to predict, according to the sensed physical motion, a position in which the feature point extracted from the first frame image is to appear in a second frame image that follows the first frame image after a fixed number of frames;
a setting unit operable to set a window in the second frame image according to the position predicted by the prediction unit;
a search unit operable to search in the set window of the second frame image for a feature point corresponding to the feature point extracted from the first frame image; and
a frame rate change unit operable to change the frame rate of the imaging unit to a higher value when the amount of the physical motion sensed by the sensing unit is greater than or equal to a predetermined threshold, wherein
the setting unit is further operable to change a size of the set window in proportion to the amount of the physical motion sensed by the sensing unit.

2. The imaging device of claim 1, wherein
the setting unit sets the window so as to include the position predicted by the prediction unit.

3. The imaging device of claim 1, wherein
the setting unit sets the window so that the position predicted by the prediction unit is in a center of the window.

4. The imaging device of claim 1 wherein
the setting unit changes the size of the window when the amount of the physical motion sensed by the sensing unit is larger than a preset value.

5. An imaging device, comprising:
an imaging unit operable to capture an image of an object;
a sensing unit operable to sense physical motion of the imaging unit;
an extraction unit operable to extract a feature point from a first frame image;
a prediction unit operable to predict, according to the sensed physical motion, a position in which the feature point extracted from the first frame image is to appear in a second frame image that follows the first frame image after a fixed number of frames;

a setting unit operable to set a window in the second frame image according to the position predicted by the prediction unit; and a search unit operable to search in the set window of the second frame image for a feature point corresponding to the feature point extracted from the first frame image, wherein the setting unit sets the window so that a center thereof is a midpoint between a position, in the second frame image, corresponding to the position of the feature point extracted from the first frame image and the position predicted by the prediction unit.

6. The imaging device of claim 5 further comprising:
a frame rate change unit operable to change the frame rate of the imaging unit to a higher value when the amount of the physical motion sensed by the sensing unit is greater than or equal to a predetermined threshold.

7. The imaging device of claim 6, wherein
the frame rate change unit is further operable to change the frame rate to a first value when the amount of the motion sensed by the sensing unit is greater than or equal to the predetermined threshold, and change the frame rate to a second value that is higher than the first value when the amount of the motion sensed by the sensing unit is greater than or equal to a second threshold that is higher than the predetermined threshold.

8. The imaging device of claim 6, wherein
the larger the physical motion sensed by the sensing unit, the higher the frame rate change unit changes the frame rate.

9. The imaging device of claim 6 further comprising:
a shutter speed change unit operable to change a shutter speed of the imaging unit to a higher value when the amount of the physical motion sensed by the sensing unit is greater than or equal to a predetermined threshold.

10. The imaging device of claim 9 further comprising:
a film speed change unit operable to change a film speed of the imaging unit to a higher value when the physical motion sensed by the sensing unit is greater than or equal to a predetermined threshold.

11. The imaging device of claim 5, wherein
the sensing unit is composed of at least one of an angular speed sensor and an acceleration sensor.

12. An imaging device, comprising:
an imaging unit operable to capture an image of an object;
a sensing unit operable to sense physical motion of the imaging unit;
an extraction unit operable to extract a feature point from a first frame image;
a prediction unit operable to predict, according to the sensed physical motion, a position in which the feature point extracted from the first frame image is to appear in a second frame image that follows the first frame image after a fixed number of frames;
a setting unit operable to set a window in the second frame image according to the position predicted by the prediction unit;
a search unit operable to search in the set window of the second frame image for a feature point corresponding to the feature point extracted from the first frame image; and
a frame change unit operable to change the frame rate of the imaging unit to a higher value when the amount of the physical motion sensed by the sensing unit is greater than or equal to a predetermined threshold, wherein
the frame rate change unit performs an operation to change the frame rate at a predetermined time interval that is longer than a time interval between frame images.

13. An imaging device, comprising:
an imaging unit operable to capture an image of an object;
a sensing unit operable to sense physical motion of the imaging unit;
an extraction unit operable to extract a feature point from a first frame image;
a prediction unit operable to predict, according to the sensed physical motion, a position in which the feature point extracted from the first frame image is to appear in a second frame image that follows the first frame image after a fixed number of frames;
a setting unit operable to set a window in the second frame image according to the position predicted by the prediction unit; and
a search unit operable to search in the set window of the second frame image for a feature point corresponding to the feature point extracted from the first frame image,
wherein the setting unit sets an entirety of the second frame image as a search range once per a predetermined number of frames.

14. An imaging method comprising the steps of:
capturing an image of an object with use of an imaging unit;
sensing physical motion of the imaging unit;
extracting a feature point from a first frame image;
predicting, according to the sensed physical motion, a position in which the feature point extracted from the first frame image is to appear in a second frame image that follows the first frame image after a fixed number of frames;
setting a window in the second frame image according to the position predicted by the prediction step; and
searching in the set window of the second frame image for a feature point corresponding to the feature point extracted from the first frame image, wherein
the setting step sets the window so that a center thereof is a midpoint between a position, in the second frame image, corresponding to the position of the feature point extracted from the first frame image and the position predicted by the prediction step.

* * * * *